Patented Feb. 27, 1951

2,543,539

UNITED STATES PATENT OFFICE 2,543,539

ANTISTATIC TREATMENT OF SHAPED ARTICLES COMPRISING A VINYL RESIN AND TREATED ARTICLES

Irvin Wizon, Springdale, Conn., assignor to American Cyanamid Company, New York, N. Y., a corporation of Maine No Drawing. Application January 28, 1949, Serial No. 73,444

6 Claims. (Cl. 117—138.8)

This invention relates broadly to the treatment of shaped articles comprising one or more vinyl resins with an anti-static agent and to the treated articles. The invention especially is concerned with a method of conditioning a shaped article (e. g., in the form of a fiber, film, etc.) comprising or formed of a thermoplastic vinyl resin to lessen its tendency to accumulate static charges of electricity thereon by contacting such an article with a phenylguanidine salt of an aliphatic (including both saturated and unsaturated aliphatic) monocarboxylic acid, which acid contains from 12 to 18 carbon atoms, inclusive, specifically phenylguanidine stearate, as well as with the products resulting from this treatment. The treatment is effected by applying to the shaped article comprising a thermoplastic vinyl resin, and which in a dry state normally has a tendency to accumulate static charges of electricity thereon, a volatile liquid containing phenylguanidine stearate, and drying the thusly treated article. It is applicable to the treatment of filaments, fibers, yarns, films, woven, knitted and felted fabrics, and other articles made from or containing one or more thermoplastic vinyl resins for the purpose of eliminating substantially completely (in some cases) or materially lessening or retarding (in all other cases) the tendency of such articles to accumulate charges of static electricity thereon either during the production of the article, or in connection with subsequent finishing operations, or during the use of the article.

Vinyl resins constitute a class of materials which develop or tend to develop an electrostatic charge upon their surfaces when fibers or other articles made therefrom are subjected to friction during their production and during processing or fabrication of the fibers into fabrics or other articles, as well as during the use of the finished article. Various treatments have been tried or suggested in an effort to prevent or reduce the accumulation of an electrostatic charge on the surfaces of shaped articles made from vinyl resins, but to the best of my knowledge and belief none has been entirely satisfactory. For example, it was suggested prior to my invention that vinyl resins, more particularly those which contain a substantial percentage of vinyl halide combined in the molecules, be treated with a water-dispersible compound having a polyalkylene polyamine nucleus, which nucleus has an average molecular weight of at least 300, or with a water-dispersible polyethylene imine having an average molecular weight of at least 300, in order to prevent or retard the accumulation of charges of static electricity upon the surfaces of filaments, fibers, yarns and various fabrics and other articles made from or containing such resins. Such compounds are relatively expensive and do not completely meet the requirements of the trade.

The present invention is based on my discovery that phenylguanidine salts of an aliphatic monocarboxylic acid that contains from 12 to 18 carbon atoms, inclusive, specifically phenylguanidine stearate, have the particular and peculiar property of functioning as anti-static agents. The invention is based on my further discovery that filaments, fibers, yarns, films and other shaped articles composed of or containing a vinyl resin, more particularly a thermoplastic vinyl resin, e. g., polyacrylonitrile, copolymers of acrylonitrile and a different vinyl compound such, for instance, as vinyl chloride, copolymers of vinyl acetate and vinyl chloride, etc., can be conditioned so as to obviate or minimize their tendency to accumulate static charges of electricity thereon by treating them with one or more of the aforementioned salts, alone or in conjunction with a conventional textile lubricant, e. g., an alkyl ester of a long-chain fatty acid, a wetting and/or dispersing agent, a detergent, etc., as briefly described in the first paragraph of this specification and more fully hereafter. These results, for which I have no theoretical explanation and which were wholly unobvious and unpredictable, are obtained without detrimentally affecting the color, tensile strength, elasticity, flexibility, chemical resistance, bacterial and fungal resistance, and other valuable properties of the vinyl resin, or without rendering the vinyl resin article in any way unsuited for its intended purpose. Surprisingly, too, the phenylguanidine salt has no appreciable (if any) delustering effect upon the vinyl resin fiber or other article to which it is applied, which is in marked contrast with the results obtained when other known anti-static agents are applied to such a fiber or other article.

Phenylguanidine stearate can be prepared, for example, by neutralizing phenylguanidine carbonate with stearic acid.

Illustrative examples of vinyl resins to which the anti-static agents employed in practicing the present invention are applicable include vinyl resins produced by the conjoint polymerization of a vinyl halide, e. g., vinyl chloride, with a vinyl ester of an aliphatic acid, e. g., vinyl acetate. Such resins are more fully described in, for example, Rugeley et al. Patent No. 2,161,766, and generally contain about 50% to about 95% by weight of combined vinyl halide in the copolymer, the remainder being a vinyl ester of an aliphatic acid. Examples of other vinyl resins to which the present invention is applicable include those formed by the conjoint polymerization of a vinyl halide, e. g., vinyl chloride, with a nitrile of an unsaturated acid, e. g., acrylonitrile, methacrylonitrile, etc.; polyvinyl chloride and other polyvinyl halides, as well as resins produced by the halogenation (e. g., chlorination) of such polyvinyl compounds; resins produced by the chlorination of copolymers of a vinyl halide with a vinyl ester of an aliphatic acid; resins produced by the conjoint polymerization of vinyl chloride or other vinyl halide with an N-alkylated imide derivative of an aliphatic acid, e. g., N-butyl maleimide; and resins produced by the conjoint polymerization of a vinyl halide, a vinyl ester of an aliphatic acid and maleic acid.

The preferred thermoplastic vinyl resins which are subjected to treatment in accordance with my invention are those in which the vinyl resin contains a substantial amount of acrylonitrile, more particularly polyacrylonitrile and thermoplastic copolymers of acrylonitrile such as those obtained by polymerizing a mixture of monomers comprising mainly, that is, a preponderant proportion by weight of acrylonitrile, and preferably those in which the acrylonitrile constitutes at least about 85% by weight of the mixture of monomers. From the foregoing it will be seen that in some cases the acrylonitrile may constitute, for example, from about 55% to about 99.5% by weight of the mixture of monomers.

Illustrative examples of monomers which may be copolymerized with acrylonitrile to yield a thermoplastic polymerization product (copolymer or interpolymer) which may be subjected to an anti-static treatment as herein described are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which may be treated in accordance with the present invention, e. g., the dimethyl, -ethyl, -propyl, -butyl, etc., esters of maleic, fumaric, citraconic, etc., acids.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054. The polymeric and copolymeric acrylonitriles which are subjected to treatment may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements by the Staudinger equation (reference: U. S. Patent No. 2,404,713).

The phenylguanidine salt may be applied to the thermoplastic vinyl resin by any suitable means, but preferably it is applied in the form of a liquid dispersion, more particularly an aqueous dispersion. This dispersion may contain any suitable amount of phenylguanidine salt, but ordinarily the salt is present in the dispersion in an amount corresponding to from about 0.5% to about 5% by weight thereof. The dispersion may be applied, for example, by immersing the fiber or other shaped article formed of or containing the vinyl resin in the dispersion, or by spraying, padding, brushing or otherwise contacting the shaped article with the dispersion. In applying the dispersion, it is preferably heated to an elevated temperature, e. g., from about 45° or 50° C. to about 95° C., or in some cases even as high as 100° C. The dispersion may be applied at room temperature (20°–30° C.) or at temperatures up to 45° C., but the lower temperatures are usually less desirable because of the somewhat greater difficulty in maintaining the phenylguanidine salt homogenously dispersed in water or other liquid dispersion medium at the lower temperatures. Upon drying the fiber or other shaped article at room temperature or at an elevated temperature, e. g., on heated drying rolls, the treated article has the aforementioned phenylguanidine salt deposited at least on the outer surfaces thereof. The amount of phenylguanidine salt which is present in or on the dried, treated article may vary considerably, but ordinarily it is present therein or thereon in an amount, by weight, corresponding to from about 0.2% to about 4% of the dried, untreated article.

It is not essential that the phenylguanidine salt be used as the sole anti-static agent or effect agent which is present in the aqueous dispersion. In some cases, however, it is advantageous to use the phenylguanidine salt alone, since, because of the long-chain aliphatic hydrocarbon grouping, specifically alkyl grouping, which is present therein, it is capable of functioning both as a lubricating agent and as an anti-static agent. In other cases it may be desirable to use the phenylguanidine salt in conjunction with a conventional textile lubricant and/or other conditioning agent or agents which are commonly employed in finishing compositions used, for example, in treating thermoplastic vinyl resins in fiber, film or other form. Such auxiliary conditioning agents include mineral, vegetable and animal oils, among which latter may be mentioned blown and unblown neat's-foot oil, sperm oil, olive oil, teaseed oil, peanut oil, soya bean oil and cottonseed oil, as well as the various sulfonated oils, e. g., sulfonated olive oil. Examples of other conditioning agents that may be employed in combination with the phenylguanidine salt are wetting and dispersing agents of various kinds, for example, N-octadecyl disodium sulfosuccinamate, dioctyl sodium sulfosuccinate, etc., lecithin, esters of long-chain fatty acids, advantageously esters of fatty acids which contain from 12 to 18 carbon atoms, inclusive, e. g., alkyl stearates, palmitates and oleates, more particularly the ethyl, propyl, butyl and amyl stearates, palmitates and oleates.

The finishing compositions containing an anti-static agent comprising phenylguanidine stearate may be applied to the shaped thermoplastic vinyl resin, for example yarns of associated filaments of such a resin, in the course of the production of the yarn or other shaped article, or subsequent to the production of the yarn and before or after any textile operations in which such yarns are used, especially those operations which include or involve a winding operation. By applying the finishing composition in the course of producing the filaments or fibers, the application may suffice for subsequent textile operations. If desired, however, the textile-treating agent containing the described anti-static agent may be applied both during the process of producing the yarns as well as later when these yarns are fabricated into textile fabrics.

The phenylguanidine salt used in practicing my invention also may be applied to thermoplastic vinyl resins when the latter are in gelled form. For example, I may apply a liquid treating agent to a fiber in gel state, more particularly an aquagel state, and in which the solid phase comprises an acrylonitrile polymerization product, more particularly such a product which contains in the molecules thereof an average of at least about 85% by weight of combined acrylonitrile, which treating agent comprises an aqueous dispersion containing phenylguanidine stearate. Thereafter the thusly treated, gelled fiber is dried, for example by continuously passing the fiber over heated drying rolls as is described more fully in Cresswell copending application Serial No. 68,370, filed December 30, 1948, and now abandoned in favor of copending application Serial No. 73,078, which was filed January 27, 1949, as a continuation-in-part of said application Serial No. 68,370. In this way the phenylguanidine salt imparts anti-static characteristics to the fiber both during and after drying thereof.

The phenylguanidine salt used in practicing the present invention is especially suitable for use in the treatment of water-swollen, oriented or unoriented fibers, films, etc., which have been produced as described, for example, in Cresswell copending application Serial No. 772,200, filed September 4, 1947, and in the aforementioned Cresswell copending application Serial No. 68,370 as well as in the treatment of the dried products, whereby the tendency of the dried material to accumulate static charges of electricity is obviated or minimized and a treated material which, in general, is softer to the touch is obtained.

As has been mentioned hereinbefore, any suitable method may be employed in applying the phenylguanidine salt or a finishing composition or textile-treating agent containing the same to the thermoplastic vinyl resin in fiber, film or other form, and it may be applied at any suitable stage of the production of the shaped article, or during its fabrication into other forms, or to the finished, fabricated article and prior to or during its service use. For example, if the conditioning agent is to be applied to the yarn after spinning, the yarn may be brought into contact with a wick, roll or felt which has been wetted with an aqueous or other dispersion or emulsion containing the phenylguanidine salt. Alternatively, the liquid finishing composition containing the phenylguanidine salt may be applied to the vinyl resin article by immersing the article in a bath containing the same, or by spraying, brushing, coating or otherwise applying the finishing composition to the article. Examples of points during the production of a yarn at which the conditioning agent may be applied are during stretching of a wet spun yarn or fiber to orient the molecules thereof, or between any of the guides or godets or other rolls employed in the spinning process, or between the guide and the point of winding and/or twisting; or, the conditioning agent may be applied to the yarn after winding onto cones, spools, bobbins or the like; or, in the case of staple fiber manufacture, the conditioning agent may be applied to the yarn either prior to or after cutting the yarn into staple lengths.

If desired, phenylguanidine salt which is deposited in or on the treated article may be allowed to remain in place during and after the production of the article in its ultimate form. Generally, however, the applied conditioning agent comprising the phenylguanidine salt is removed either prior to dyeing or, if it has been applied to the dyed article, prior to the sale of the article to the trade. The conditioning agent may be removed, if desired, from yarns, fabrics and the like containing the same by means of the usual aqueous scouring baths.

In order that those skilled in the art better may understand how the present invention can be carried into effect, the following examples are given by way of illustration and not by way of limitation. All parts and percentages are by weight.

*Example 1*

A swatch of thread spun from a copolymer of 95% acrylonitrile and 5% methyl acrylate as described in the aforementioned Cresswell copending application Serial No. 772,200 was used in this example. The swatch had been air dried, and picked up static electricity very readily when stroked with the hand or with a piece of cellulose acetate in strip form.

The swatch was immersed for about 1 or 2 minutes in an aqueous dispersion containing 2.5% of phenylguanidine stearate. The dispersion was maintained at 45°–50° C. during the treatment. The treated swatch was dried first at room temperature and then in a 60° C. oven for about 60 minutes. After drying, the swatch felt smoother and softer than it did before the treatment; furthermore, it maintained its original luster and failed to develop a static charge when stroked either with the hand or with a piece of cellulose acetate in strip form.

Similar results are obtained when the above dispersion of phenylguanidine stearate is applied to the same acrylonitrile-methyl acrylate copolymer in the form of a film.

*Example 2*

Same as Example 1 with the exception that the aqueous dispersion contained 1% of phenylguanidine stearate and 1% of N-octadecyl disodium sulfosuccinamate, which latter was used to facilitate the dispersion of the phenylguanidine stearate. Similar results were obtained.

*Example 3*

A sample of polyacrylonitrile having an average molecular weight of about 141,000 was dissolved in a 53% aqueous, neutral solution of calcium thiocyanate at about 45° C. under an atmosphere of carbon dioxide in the proportion of about 7 parts of polymer to about 93 parts of calcium thiocyanate solution. The solution of polyacrylonitrile was spun by extruding it at about 70-80° C. through a 40-hole spinneret having hole diameters of 110 microns into a spinning bath consisting of water at 1-2° C. The coagulated fiber was carried back and forth through the bath by means of a power-driven, submerged godet placed at one end of the bath and a set of free-running rollers at the other end. The total bath travel of the fiber was about 144 inches. On leaving the bath the yarn was subjected, during its travel, to a stretch of about 600% in a hot water bath maintained at 98-99° C., and was finally collected on a bobbin rotating in a water spray to keep the yarn in gel state.

Swatches of polyacrylonitrile yarn produced as above described were treated both in a water-swollen, gelled state and in a dried state, in which latter form they accumulated a charge of static electricity when stroked either by hand or with a strip of cellulose acetate.

In one case a swatch of dried yarn was treated with an aqueous dispersion containing 2.5% of phenylguanidine stearate as described under Example 1, the treated swatch being dried first at room temperature and then in a 60° C. oven for about 60 minutes. In the other case, a swatch of the gelled yarn was worked in an aqueous dispersion containing 2% of phenylguanidine stearate and 1% of N-octadecyl disodium sulfosuccinamate for about 1 or 2 minutes, after which it was dried in the same manner as was the other swatch. An electrostatic charge could not be developed on either of the dried, treated swatches when stroked with the hand or with a strip of cellulose acetate, and the luster of the treated swatches appeared to be the same as that of the dried, untreated polyacrylonitrile yarn.

*Example 4*

The following fibers produced from other thermoplastic vinyl resins were used in this example:

1. Orlon (a polyacrylonitrile fiber).
2. Vinyon (made from a high-molecular-weight copolymer of about 88-90% vinyl chloride and about 12-10% vinyl acetate).
3. Vinyon N (made from a copolymer of about 60% vinyl chloride and about 40% acrylonitrile).

Dry swatches of the above fibers became readily charged with static electricity when stroked with the hand.

Each of the dry swatches was immersed in an aqueous dispersion containing 2.5% of phenylguanidine stearate for about 1 or 2 minutes, the dispersion being maintained at 45°-50° C. during the treatment, after which they were dried first at room temperature and then in an oven maintained at about 60° C. for about 60 minutes. The dry, treated swatches did not develop any electrostatic charge when stroked either with the hand or with a piece of cellulose acetate in strip form. The treated specimens exhibited no changes in luster, in color or any other material changes in properties from those exhibited by the swatches prior to the treatment with the exception that they had a softer feeling to the touch and would not develop a static charge.

*Example 5*

Same as Example 4 with the exception that the aqueous dispersion contained 1% of phenylguanidine stearate and 1% of N-octadecyl disodium sulfosuccinamate. Similar results were obtained.

*Example 6*

Same as Example 4 with the exception that only orlon and Vinyon N were treated, the aqueous dispersion employed was one containing 2% phenylguanidine stearate and 1% of N-octadecyl disodium sulfosuccinamate, and the dispersion was maintained at room temperature (about 25° C.) and vigorously agitated during the treating period. Similar results were obtained.

*Example 7*

In this example a swatch of dried, polyacrylonitrile yarn produced as described under Example 3 was treated as described under that example with an aqueous dispersion containing 1% of phenylguanidine stearate and 1% of N-octadecyl disodium sulfosuccinamate. Similar results were obtained.

It will be understood, of course, by those skilled in the art that the invention is not limited to the treatment of the specific vinyl resins given by way of illustration in the foregoing examples, since, to the best of my knowledge and belief, any thermoplastic vinyl resin which in its dry state normally accumulates or tends to accumulate static charges of electricity is amenable to treatment with a phenylguanidine salt (or mixture of phenylguanidine salts) of the kind embraced by Formula I to obviate or minimize the accumulation of static charges of electricity thereon. Numerous examples of such vinyl resins have been given hereinbefore.

As has been indicated in a portion of this specification prior to the examples, the preferred vinyl resin which is subjected to treatment in accordance with this invention is polymeric acrylonitrile or copolymeric acrylonitrile containing in its molecules a substantial amount of combined acrylonitrile. Of such copolymeric acrylonitriles, I prefer to treat an acrylonitrile copolymer containing in the polymer molecules an average of at least about 85% by weight of combined acrylonitrile. In such copolymeric acrylonitrile products, the proportions of monomers in the polymerizable mixture from which the copolymers are made preferably are adjusted so that the final copolymer contains in the molecules thereof an average of at least about 85% by weight of acrylonitrile (combined acrylonitrile). The expression "acrylonitrile polymerization product containing in the molecules thereof an average of at least about 85% by weight of combined acrylonitrile," as used herein and in certain of the appended claims, means a polymerization product (polymer, copolymer or interpolymer or mixture thereof) containing in its molecules an average of at least about 85% by weight of the acrylonitrile unit, which is considered to be present in the individual polymer molecule as the group

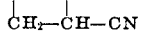

or, otherwise stated, at least about 85% by weight of the reactant substance converted into and forming the polymerization product is acrylonitrile (combined acrylonitrile). Examples of monomers which may be employed in the preparation of such copolymers of acrylonitrile have been given hereinbefore.

The use of phenylguanidine stearate in the treatment of thermoplastic vinyl resins to obviate or lessen the tendency of such resins to accumulate charges of electricity thereon has numerous advantages, among which may be mentioned their relatively lower cost as compared with others which have been suggested for this same general purpose; their ease of application (e. g., as aqueous dispersions); the fact that they do not form insoluble compounds in dispersions in hard water; their effectiveness both as anti-static agents and in lubricating and softening the shaped article in yarn or other form, whereby the treated yarn, film or other article is rendered more amenable to further processing or fabricating (e. g., weaving, knitting, etc., in the case of yarns); their compatibility with other conditioning agents commonly employed in finishing compositions used in treating fibers and other shaped articles formed of or containing a vinyl resin; their ease of removal from the treated article, when such removal appears to be desirable for subsequent processing or use of the article; their non-harmful effect upon the thermoplastic vinyl resin which is subjected to treatment, and especially the fact that they have little, if any, delustering effect upon the resin; as well as other advantages.

The term "yarn" as used generically herein and in the appended claims includes within its meaning a single filament, a plurality of filaments associated into the form of a thread and which may be of any desired twist, single or multiple threads associated or twisted together, as well as staple fibers produced from filaments or threads and spun yarn produced from such staple fibers. The term "fiber" as used generically herein and in the appended claims includes within its meaning both monofilaments and multifilaments.

I claim:

1. The method of conditioning a shaped article comprising a thermoplastic vinyl resin containing in its molecules a substantial amount of combined acrylonitrile in order to lessen its tendency to accumulate static charges of electricity thereon, said method comprising applying to the said article a volatile liquid containing phenylguanidine stearate in an amount such that the finished article has associated therewith from, by weight, 0.2% to 4% of the said stearate, based on the weight of the dried, untreated article, and drying the thusly treated article.

2. The method of treating fibers of a thermoplastic product of polymerization of a polymerizable mass comprising at least about 85% by weight of acrylonitrile to impart anti-static characteristics thereto, said method comprising contacting the said fibers with an aqueous dispersion containing from about 0.5% to about 5% by weight thereof of an anti-static agent comprising phenylguanidine stearate and drying the thusly treated fibers, the amount of the said dispersion which is applied to the said fibers being such that the dried fibers have associated therewith from, by weight, 0.2% to 4% of the said stearate, based on the weight of the dried, untreated fibers.

3. The method which comprises applying a liquid treating agent to a fiber in gel state and in which the solid phase comprises an acrylonitrile polymerization product containing in the molecules thereof an average of at least about 85% by weight of combined acrylonitrile, said treating agent comprising an aqueous dispersion containing phenylguanidine stearate; and drying the thusly treated, gelled fiber, the said phenylguanidine stearate imparting anti-static characteristics to the said fiber during and after drying thereof, and the amount of the said dispersion which is applied to the said fibers being such that the dried fibers have associated therewith from, by weight, 0.2% to 4% of the said stearate, based on the weight of the dried, untreated fibers.

4. A shaped article comprising a thermoplastic vinyl resin which contains in its molecules a substantial amount of combined acrylonitrile and which in a dry state normally has a tendency to accumulate static charges of electricity thereon, said article having deposited at least on outer surfaces thereof phenylguanidine stearate, and the said phenylguanidine stearate lessening the tendency of the said article to accumulate static charges of electricity thereon and being associated with the said article in an amount corresponding to from 0.2% to 4% of the weight of the dried, untreated article.

5. A textile formed of fibers including fibers of a thermoplastic product of polymerization of polymerizable vinyl compound including a substantial amount of acrylonitrile, said textile in a dry state normally having a tendency to accumulate static charges of electricity thereon and, to lessen this tendency, having been treated with an anti-static agent comprising phenylguanidine stearate, the amount of the said stearate which is associated with the said textile corresponding to from 0.2% to 4% of the weight of the dry, untreated textile.

6. Textile fibers formed of an acrylonitrile polymerization product containing in the molecules thereof an average of at least about 85% by weight of combined acrylonitrile, said fibers having deposited at least on outer surfaces thereof a conditioning agent comprising phenylguanidine stearate, said phenylguanidine stearate lessening the tendency of the said fibers to accumulate static charges of electricity thereon and constituting from 0.2% to 4% of the weight of the dry, untreated fibers.

IRVIN WIZON.

REFERENCES CITED

The following references are of record in the file of this patent:

UNITED STATES PATENTS

| Number | Name | Date |
|---|---|---|
| 2,041,836 | Hunt | May 26, 1936 |
| 2,378,724 | Oldham | June 19, 1945 |
| 2,403,960 | Stoops et al. | July 16, 1946 |